United States Patent
Lester et al.

(10) Patent No.: US 6,996,564 B2
(45) Date of Patent: Feb. 7, 2006

(54) PROACTIVE INTERNET SEARCHING TOOL

(75) Inventors: Edward Lester, Boca Raton, FL (US); Chris Stewart, Tamarac, FL (US)

(73) Assignee: The DirecTV Group, Inc., El Segundo, CA (US)

( * ) Notice: Subject to any disclaimer, the term of this patent is extended or adjusted under 35 U.S.C. 154(b) by 358 days.

(21) Appl. No.: 10/051,933

(22) Filed: Jan. 17, 2002

(65) Prior Publication Data

US 2003/0041060 A1 Feb. 27, 2003

Related U.S. Application Data

(60) Provisional application No. 60/312,210, filed on Aug. 13, 2001.

(51) Int. Cl.
*G06F 17/30* (2006.01)

(52) U.S. Cl. .......................................... 707/10; 709/217
(58) Field of Classification Search ................... 707/10; 725/40, 42, 45; 709/217
See application file for complete search history.

(56) References Cited

U.S. PATENT DOCUMENTS

| | | | |
|---|---|---|---|
| 5,157,491 A | 10/1992 | Kassatly | |
| 5,163,046 A | 11/1992 | Hahne et al. | ............... 370/237 |
| 5,410,344 A | 4/1995 | Graves et al. | |
| 5,557,724 A | 9/1996 | Sampat et al. | |
| 5,563,648 A | 10/1996 | Menand et al. | |
| 5,594,935 A | 1/1997 | Reber et al. | |
| 5,668,591 A | 9/1997 | Shintani | |
| 5,714,997 A | 2/1998 | Anderson | |
| 5,724,091 A | 3/1998 | Freeman et al. | |
| 5,819,034 A | 10/1998 | Joseph et al. | |
| 5,857,190 A | 1/1999 | Brown | |
| 5,861,881 A | 1/1999 | Freeman et al. | |
| 5,889,954 A | 3/1999 | Gessel et al. | |
| 5,933,827 A * | 8/1999 | Cole et al. | ..................... 707/10 |
| 6,052,554 A | 4/2000 | Hendricks et al. | |
| 6,067,107 A | 5/2000 | Travaille et al. | |
| 6,097,739 A | 8/2000 | Yamashita | .................. 370/528 |
| 6,101,536 A | 8/2000 | Kotani et al. | |
| 6,268,849 B1 * | 7/2001 | Boyer et al. | ................. 709/217 |
| 6,308,081 B1 | 10/2001 | Kolmonen | .................. 455/522 |
| 6,393,427 B1 * | 5/2002 | Vu et al. | ..................... 707/101 |
| 6,466,972 B1 | 10/2002 | Paul et al. | |
| 6,470,498 B1 | 10/2002 | Reber et al. | |

(Continued)

OTHER PUBLICATIONS

Yahoo! Pres Release, "Yahoo! Launches Yahoo! En Español, Spanish Language Web Guide Features Spanish Programming and Resource for the Global Spanish Speaking Community," Jun. 8, 1998.*

*Primary Examiner*—Jack M. Choules
(74) *Attorney, Agent, or Firm*—Georgann S. Grunebach

(57) ABSTRACT

A system and method for providing an Internet user that has no pre-conceived notion of the specific subject matter he or she wishes to initially view, with a graphical user interface which assists the user in locating a web site of interest by first displaying a variety of general categories, each corresponding to a plurality of content-related web sites, and gradually guiding the user to a web page of interest. The system allows an Internet user to review information that has been acquired solely to stimulate their imagination. The invention utilizes an "Imagination Guide", which presents, on the use's computer screen, a plurality of subject category headings, each heading identifying a unique area of interest. The user can select a preferred language, and is then presented by the list of subject categories corresponding to the selected language. Each subject category corresponds to an "Imagination" Data Base containing accessible web page URLs, each represented by a specific channel number, and all having subject matter related to the user's selected subject category.

10 Claims, 15 Drawing Sheets

U.S. PATENT DOCUMENTS

| | | |
|---|---|---|
| 6,490,356 B1 | 12/2002 | Beuque |
| 6,499,027 B1 | 12/2002 | Weinberger |
| 6,504,990 B1 | 1/2003 | Abecassis |
| 6,606,746 B1 | 8/2003 | Zdepski et al. |
| 6,675,385 B1 | 1/2004 | Wang |
| 6,680,746 B2 | 1/2004 | Kawai et al. |
| 6,728,705 B2 * | 4/2004 | Licon et al. .................... 707/3 |
| 6,788,710 B1 | 9/2004 | Knutson et al. ............ 370/535 |
| 6,792,007 B1 | 9/2004 | Hamada et al. |
| 6,801,936 B1 | 10/2004 | Diwan |
| 6,816,201 B1 | 11/2004 | Fang et al. |
| 2001/0019360 A1 | 9/2001 | Tanaka et al. |
| 2001/0036198 A1 | 11/2001 | Arsenault et al. ........... 370/477 |
| 2002/0069411 A1 | 6/2002 | Rainville et al. |
| 2002/0069416 A1 | 6/2002 | Stiles |
| 2002/0188943 A1 | 12/2002 | Freeman et al. |
| 2003/0105845 A1 | 6/2003 | Leemakers |
| 2003/0214982 A1 | 11/2003 | Lorek et al. ................. 370/537 |
| 2004/0228315 A1 | 11/2004 | Malkamaki ............... 3770/342 |

\* cited by examiner

PROACTIVE INTERNET SEARCHING TOOL

This Application claims the benefit under 35 U.S.C. §119(e) of U.S. provisional application, Ser. No. 60/312,210, filed Aug. 13, 2001.

BACKGROUND OF THE INVENTION

1. Field of the Invention

The invention generally relates to an Internet content searching tool and more particularly to a system and method for providing an Internet viewer that has no pre-conceived notion of the specific subject matter he or she wishes to initially view, with an Internet searching tool which assists the viewer in locating a web page of interest by presenting a variety of general categories, each corresponding to a plurality of content-related web page.

2. Description of the Prior Art

In today's world, the Internet has become the most popular and easiest source of information and entertainment. When one wants to learn the latest-breaking news, one simply logs onto the Internet and contacts one's favorite news web site, such as MSNBC® or CNN®. If access to the latest sports scores is desired, a fan can simply contact his or her favorite sports network site, such as ESPN®, or FOX®.

However, it is often the case that the viewer does not know exactly what he or she is looking for, but just knows that he or she want to be entertained. In this instance, viewers resort to the television, flipping through channel after channel in order to find entertaining subject matter. One would think that it would subject matter. However, present Internet searching tools require that the user have a general subject area in mind. But this is not a practical approach. When going to a library or bookstore, for example, one may not have the name of a book in mind, or may not even have a subject in mind. Rather, people browse through aisles, hoping a catchy advertisement or book title catches their eye. Book browsers may follow signs leading them through aisles corresponding to a particular subject, narrowing their searches, until they focus on an interesting book.

A similar system is needed for Internet users. Existing Internet searching systems are based upon the requirements that users have an idea of what they are seeking. Existing systems require the user to enter the exact URL corresponding to a particular web site or key words that describe the subject matter they are interested in. But systems of this kind are reactive instead of proactive and do not account for the users who have no idea of where they wants to travel on the Web, or the subject matter they wish to access and simply want so be "taken somewhere" that is interesting.

Accordingly, what is needed in the art is a system and method designed to provide Internet users that have no specific web site or subject matter in mind, with an easy-to-use graphical interface navigation tool which presents the user with a plurality of subject category choices, each corresponding to a list of common-theme web sites, in such a manner that the user can easily navigate toward the web sites that are associated with the user's selected general area of interest.

It is, therefore, to the effective resolution of the aforementioned problems and shortcomings of the prior art that the present invention is directed.

SUMMARY OF THE INVENTION

The present invention deviates from prior art Internet searching systems by no longer requiring users to have a pre-conceived idea of the information they are seeking. Instead, the present invention is a method for allowing Internet users to review information that has been acquired solely to stimulate their imaginations. This paradigm shift supplies a unique entertainment value to the World Wide Web.

Generally, the invention utilizes an "Imagination Guide", which displays, on the use's computer screen, a plurality of subject category headings, each heading identifying a unique area of interest. After the user screen allows a user to select a preferred language, the screen is refreshed and the user is again presented with the list of subject categories. Preferably, different subject category choices are presented depending upon the language selected. Each subject category is associated with an "Imagination" database containing groups of web page URLs, each web page represented by a specific channel number, each having subject matter related to a unique subject category.

Specifically, the invention is a method for use in a communications network to proactively assist a user in locating one or more web sites, stored on servers connected to said communications network, wherein each web site is associated with a subject category based upon the user's chosen general area of interest.

The method comprises the steps of providing the user with an option of either selecting a specific web site or selecting one of a plurality of subject categories and displaying a plurality of subject categories, wherein each subject category is identified by a subject heading and is associated with a set of one or more web pages, each web page represented by a separate channel number, wherein each of said set of web pages contain content related to a particular subject category. If the user selects one of the subject categories, the user visually receives a display of one or more channel numbers, each channel number corresponding to a web page, with subject matter related to the selected subject category. The user display allows the user to select one of the displayed channels and retrieves and displays web page content corresponding to the selected channel.

The system further displays channel content summary descriptions which enable the user to easily identify the general subject matter content of each web site. The system also displays related subject category information corresponding to the subject matter of the selected subject category.

In the preferred embodiment, prior to the step of allowing the user to select one of said displayed channels, the system allows the user to initially select one of a plurality of languages wherein upon the initial selection and prior to a subsequent selection of a different language, text in each subsequent display will be in the selected language, and wherein a different set of subject categories are presented for each selected language. The related subject category information corresponding to the subject matter of the selected subject category includes advertisements, logos and/or scrolling text, which are displayed at various locations on the user's computer screen.

Preferably, the user selects the subject categories, language and/or channel by clicking on a remote control display appearing on the user's computer screen. The remote control display resembles a hand-held remote control device commonly used by television viewers to navigate through television channels.

It is therefore an object of the present invention to provide an Internet-content searching tool to assist users who do not have a specific area of interest in mind.

It is another object of the present invention to provide an Internet-content searching tool that presents the user with a list of general subject matters, each subject matter specific to the language chosen by the user.

It is still another object of the present invention to provide an Internet-content searching tool that includes a remote control image on the computer screen thereby simulating browsing through channels on a television.

It is yet another object of the present invention to provide an Internet-content searching tool that retrieves, groups and presents to the user a set of web sites with similar subject matter, each followed by a brief identification description thereby allowing the user, after having selected a general subject category, to access a particular web page.

It is still another object of the present invention to rotate and display advertisements, logos and text on the user's computer screen, each related to the general subject matter selected by the user.

It is to be understood that both the foregoing general description and the following detailed description are explanatory and are not restrictive of the invention as claimed. The accompanying drawings, which are incorporated in and constitute part of the specification, illustrate the preferred embodiment of the present invention and together with the general description, serve to explain principles of the present invention.

In accordance with these and other objects which will become apparent hereinafter, the instant invention will now be described with particular reference to the accompanying drawings.

DESCRIPTION OF THE PREFERRED EMBODIMENTS

The present invention is a method and system for providing an Internet user that has no pre-conceived notion of the specific subject matter he or she wishes to initially view, with a graphical user interface which assists the viewer in locating subject matter of interest by first presenting the user with a variety of general categories, each corresponding to a plurality of content-related web sites, and ultimately guiding the user to a specific web page corresponding to the user's selected subject matter of interest.

Figure 1:
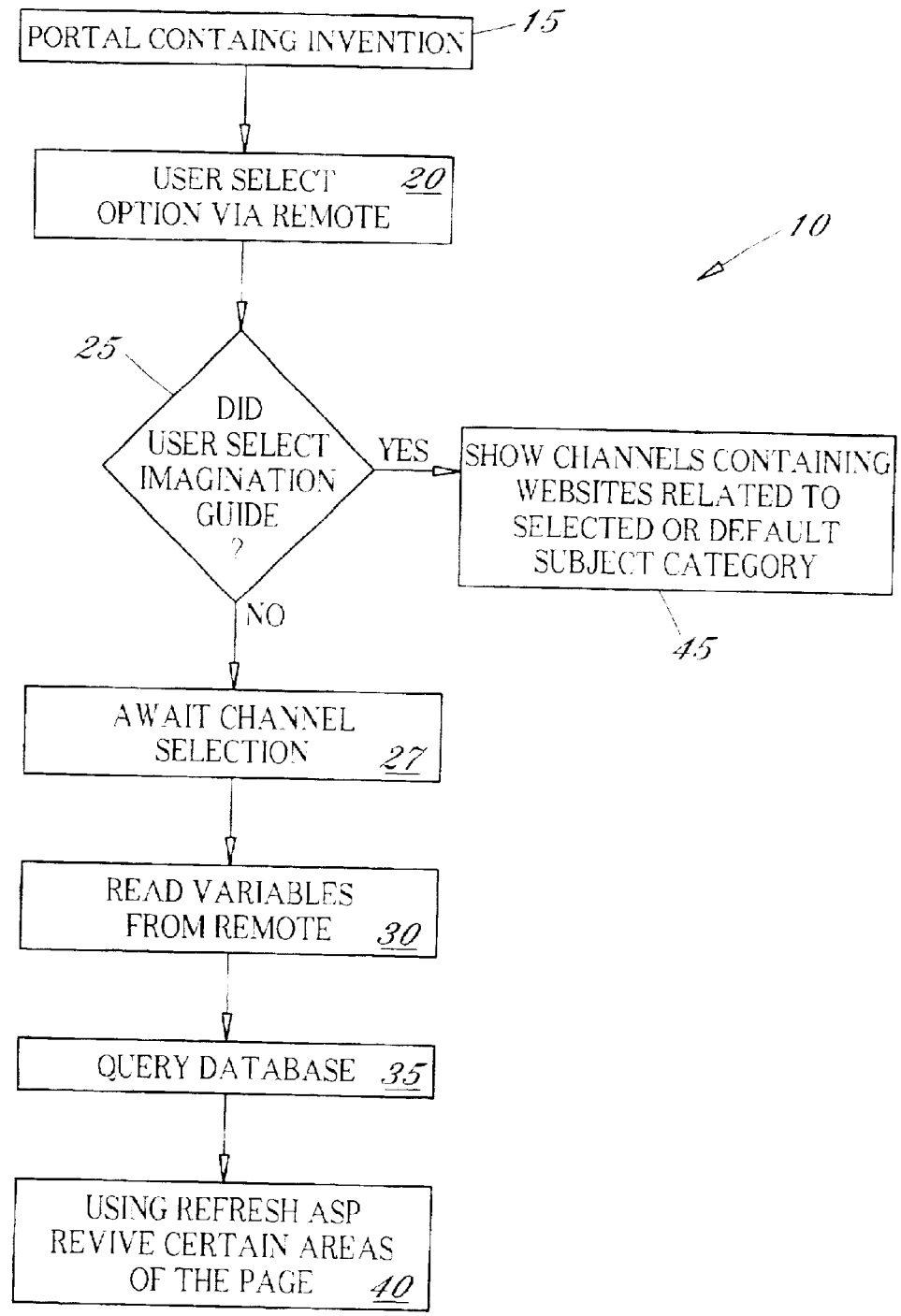
FIG. 1 illustrates a flow diagram showing the steps performed by the present invention.

Referring to FIG. 1, a flowchart is shown which illustrates the steps performed by the present invention 10. The user, upon accessing the web site portal 15 containing the invention is first presented with a choice of accessing a specific web site, represented by a channel number, or accessing an "Imagination Guide" ("IG"). The user can make this selection easily in a number of ways. The traditional method is by entering the web sites' URL. The user will then be connected with the selected web site. Alternately, the user can make selections via a remote control image via step 20 (shown in FIG. 2). This image allows the user to select specific channels representing web pages in the same way the user would choose a channel to view on his or her television set. The user may have access to a list of available web pages, each represented by a different channel number. The list is often provided by the user's interactive television service provider. Finally, if the user does not know the specific web page he or she wishes to view, and instead wants to be taken to various places that might be of interest, the user can invoke the IG by simply pressing the "IMAGINATION GUIDE" button 75 on the remote control image 60 (see FIG. 2).

The user, therefore, has the option of choosing a channel or invoking the Imagination Guide. If the Imagination Guide is selected 25, a listing of channels are shown, each channel representing one or more websites having subject matter relating to a selected or a default subject category 45. If the Imagination Guide has not been selected, the system awaits a channel selection, step 27. Once a specific channel has been selected, the system reads the user's input via step 30 and retrieves the web page associated with the selected channel by querying a database of channel numbers 35 and refreshing several areas of the present page, via step 40. This will be discussed in greater detail below.

Figure 2:
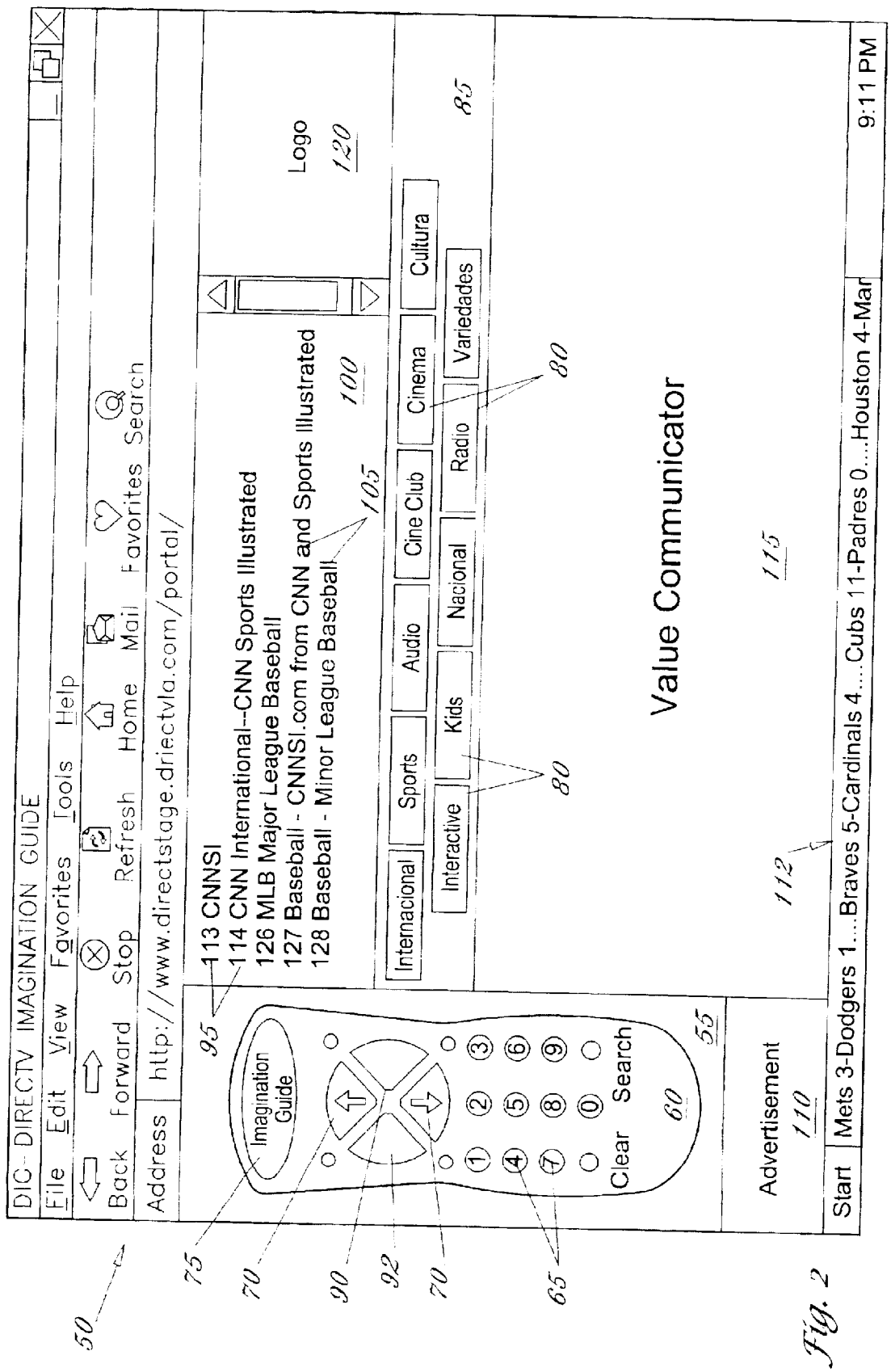
FIG. 2 illustrates a typical user computer screen of a user' computer connected to a web portal containing the present invention.

Upon entering the IG mode, the user has informed the system that he or she does not have a specific subject in mind and wants simply to use his or her "imagination" and be guided to an interesting or entertaining subject. The IG is comprised of an IG database that includes sets of web page addresses and links, each set associated with a specific subject category. These subject categories are displayed as headings on the user's computer screen, as seen in FIG. 2. The IG database is further classified by language; each language has a set of corresponding subject categories, which has associated with it a unique collection of web page addresses and links. Therefore, different combinations of user-selected languages result in the display of different subject categories.

A user computer is connected to a portal containing the present invention. The user's computer screen is represented in FIG. 2, showing the various computer screen sections. It is to be understood that FIG. 2 represents the preferred layout of the user computer screen utilizing the present invention. Other orientations of screen layouts are equally applicable. For example, the remote control image may appear on the right side of the screen or may not appear at all, while advertisements, logos, web site content and scrolling text may appear at various other locations on the screen.

Screen 50 is comprised of several sections. A remote control image section 55 depicts an image of a remote control device 60. Here, the user can simply select a channel to be viewed by clicking on the appropriate number buttons 65, navigate to other channels by clicking on the channel navigational buttons 70 or clicking on the IMAGINATION GUIDE button 75. If, for example, the user knows that channel 113 corresponds to an international sports site (such as CNN® International), the user simply points and clicks the mouse on the "1", "1" and "3" buttons on remote control image 60. The system accesses a database where each channel number is stored along with its web pages, each having its associated URL. The appropriate web page is retrieved, various sections of the screen are refreshed and content form the selected web page is displayed.

If the user wants to invoke the IG, he or she simply clicks on the "IMAGINATION GUIDE" button 75 on remote control image 60, and the user is taken into the "IG mode". Referring once again to FIG. 2, it can be seen that a plurality of subject categories 80 are listed in the Subject Category section 85. After entering the IG mode, the user can select which subject category he or she wants to access. It is to be understood that the number of subject categories 80 is not fixed, and can be expanded to virtually any number, limited only by the amount of available viewable space on the user's computer screen.

In the preferred embodiment of the invention, prior to choosing subject category 80, the user is presented with the option of choosing a classification, such as a language, via the language selector button 90 on remote control image 60. The choice of subject categories 80 changes for each language selected. For example, if the user selects Spanish, the subject categories would include subjects particular to a Spanish audience. In one embodiment, the language choices are Spanish, English and Portuguese, although the present invention is not limited in the number or variety of possible language selections.

View button 92 allows the user to vary the locations of the subject categories 80, i.e., by repeatedly clicking on the view button 92, the subject category headings can appear at different locations on the user's screen such as along the right side, the left side, or along the bottom.

It is important to note that the present invention does not merely present the user with, for example, the same fifteen subject categories, each with associated web page and advertisement links, regardless of the language selected by the user, with the only difference being the language of the text. Instead, the present invention is specifically tailored to different audiences by taking into account that different audiences have different areas of interest. For example, a Spanish-speaking user, by selecting "SPANISH" from remote control image 60 as the language of choice, is presented with categories that, through market research, have been shown to be of particular interest to the Spanish-speaking public. Soccer and Spanish newsworthy events might be included. Therefore, the invention not only translates all text into the selected language, but displays different subject category choices for each language selected.

The present invention is not limited to language classifications, but can also apply to virtually any other classifications such as, for example, teen-agers, senior citizens or women. By selecting a "classification", the user can be presented with a listing of user-classifications, and asked to select one. After selecting "TEENAGERS", for example, the entry is detected by the system and that portion of the database containing the subject categories related to the selected classification, is displayed to the user. Therefore, the system would display subject categories corresponding to subject matters that generally interest teenagers. These subject categories would differ from the subject categories displayed after the user has selected, "women" or "senior citizens".

Once the user has selected a subject category 80, whether entering a specific classification or just accepting the default classification and its subject categories, the system refreshes each of the screen sections, depending on the subject category or language chosen. If, for example, "SPORTS" is the subject category chosen, the system searches its database for the group of web page URLs having a sports theme and displays these web pages.

The Imagination Guide display 100 appears in FIG. 2. If the IG is selected, channels are displayed in section 100. Preferably, a channel number 95 appears first, followed by a plurality of website headings (ESPN, FOX, for example). The next channel in the listing may contain additional websites heading. By clicking on each heading, the user can access the website, the content of which appears in section 115.

If the IG is not selected, the user may select a channel instead by entering the channel number in the remote control image 60, or by clicking on the channel listings 95 in section 100. For example, the user may click on channel 113, which may be corresponding to SPORTS-related web pages. Section 100 displays the channels in ascending order, giving the user a quick way to browse through the various channels. In section 100, following the each channel number is a brief one or two word description 105 of the subject matter contained in the web page (e.g. "Baseball Scores", "World Sports") and/or identification of the name of the web site sponsor (ESPN®, FOX®, CNN® etc.). This information provides the user with enough information to allow the user to select a specific web page from the listed channels 95. In this fashion, the invention is proactive rather than reactive in that it "feeds" small amounts of information to the user, starting with a list of subjects of wide variety, hopefully stirring the user's interest, presenting the user with a listing of web pages containing subject matter related to the selected subject category 80 and then helping the user narrow his or her choice, until he or she selects a web page containing the subject matter of most interest.

In FIG. 2, channels 113, 114, 126 and 127 appear in section 100. If the IG had been selected, all channels corresponding to websites matching the selected subject category would appear. FIG. 2 represents a screen where the user has not yet selected the IG or a channel and is merely presented with a default screen, i.e. a listing of channel numbers 95, followed by website descriptions 105.

Other sections of the computer screen are refreshed to correspond with the selected subject category 80. Advertisements corresponding to the chosen subject appear in the lower left of screen section 110. In the preferred embodiment, advertisements are rotated, and new advertisements appear after a predetermined amount of time if the user does not click on the advertisement.

Section 112 is a Ticker Section. Here, text is scrolled, much like a ticker tape. If, for example, "SPORTS" is the category chosen, updated game scores appear in this section. Other logos appear throughout the screen, including section 120, each corresponding with the subject category 80 selected.

After viewing the choice of channels and their brief subject descriptions 105 in section 100, the user selects a channel 95. Web page content corresponding to the selected channel 95 is then shown in section 115, the "Value Communicator" section along with other helpful information which is shown to the user in other portions of computer screen 50.

Figure 3:
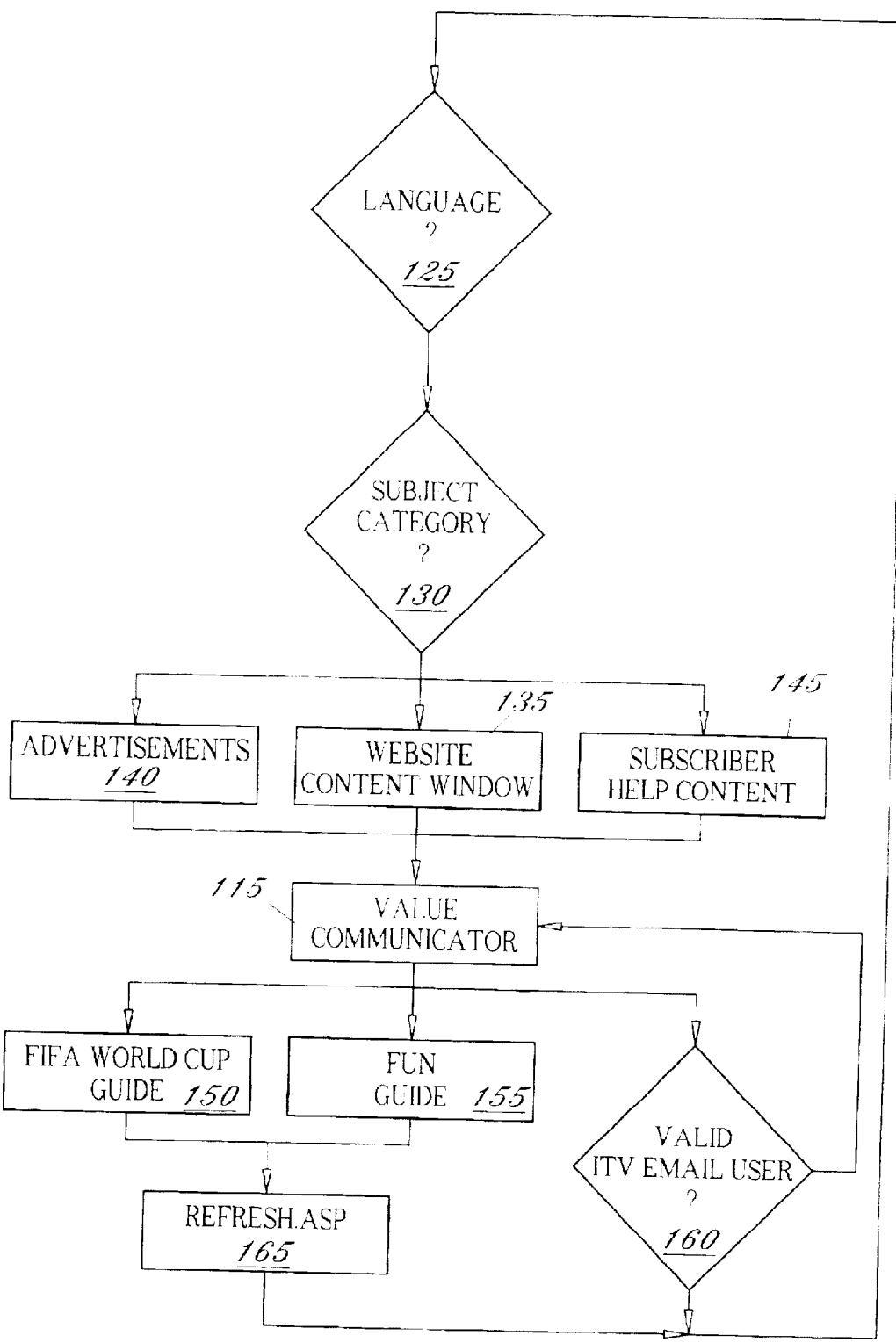
FIG. 3 illustrates a flow diagram showing the steps performed by the Value Communicator portion of the present invention.

FIG. 3 illustrates how the present invention updates screen information in section 115 (FIG. 2) depending on the user's input. Section 115 is known as the "Value Communicator" section of the screen and provides valuable information to the user including web page content. As discussed earlier, the user is given a choice of languages in which to operate in. After selecting a language, via step 125, the user then selects a subject category, via step 130. Subject content 135 is displayed in section 115 corresponding to the chosen subject category. At the same time, advertisements 140 and user help content 145 are also displayed on screen 50. All of the presented information is related in subject matter to the selected subject category heading. For example, if SPORTS is the selected subject, advertisements for sporting equipment or sporting events would appear along with logos such as ADIDAS®, or NIKE®. From here, additional useful information can be presented to the user, such as specific promotional or upcoming events (e.g. "World Cup Guide" 150) and entertainment packages 155. The system can also provide information on other non-related information such as interactive television e-mail 160. The refresh.asp subroutine 165 refreshes the screen content if another language or subject category is chosen.

Figure 4:
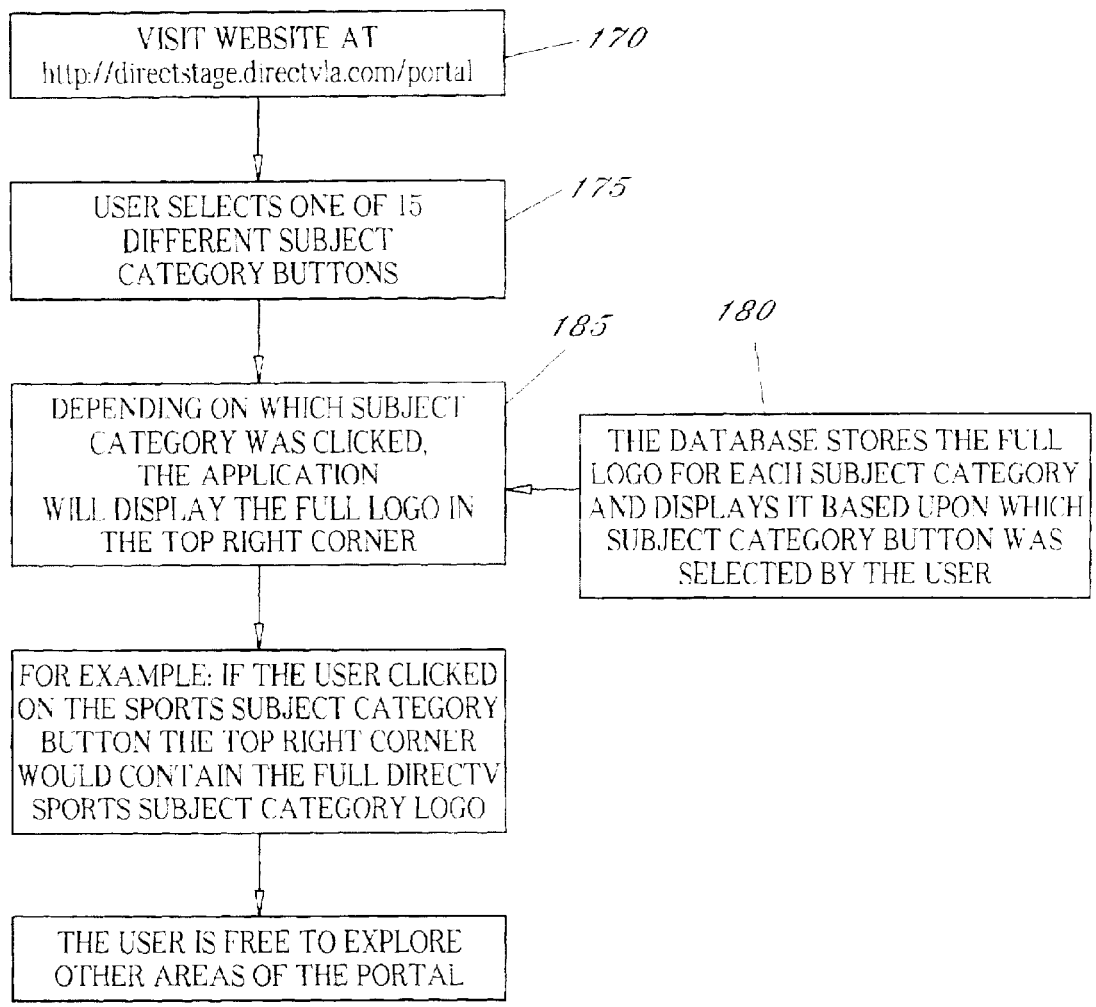
FIG. 4 illustrates a flow diagram showing the steps performed by the Subject Category Selector portion of the present invention.

FIG. 4 illustrates the steps taken by the present invention in presenting the user with a choice of available subject categories 80. The user first visits the web site portal that incorporates the present invention, step 170. The user, if in IG mode, selects one of the subject categories, via step 175. The database stores the web site location of one or more logos corresponding to the subject matter of each subject category heading and the system displays the logo based upon which subject category heading was selected by the user, step 180. Depending upon which subject category heading was clicked, the application displays a logo in the top corner, or in another screen location, step 185.

Figure 5:
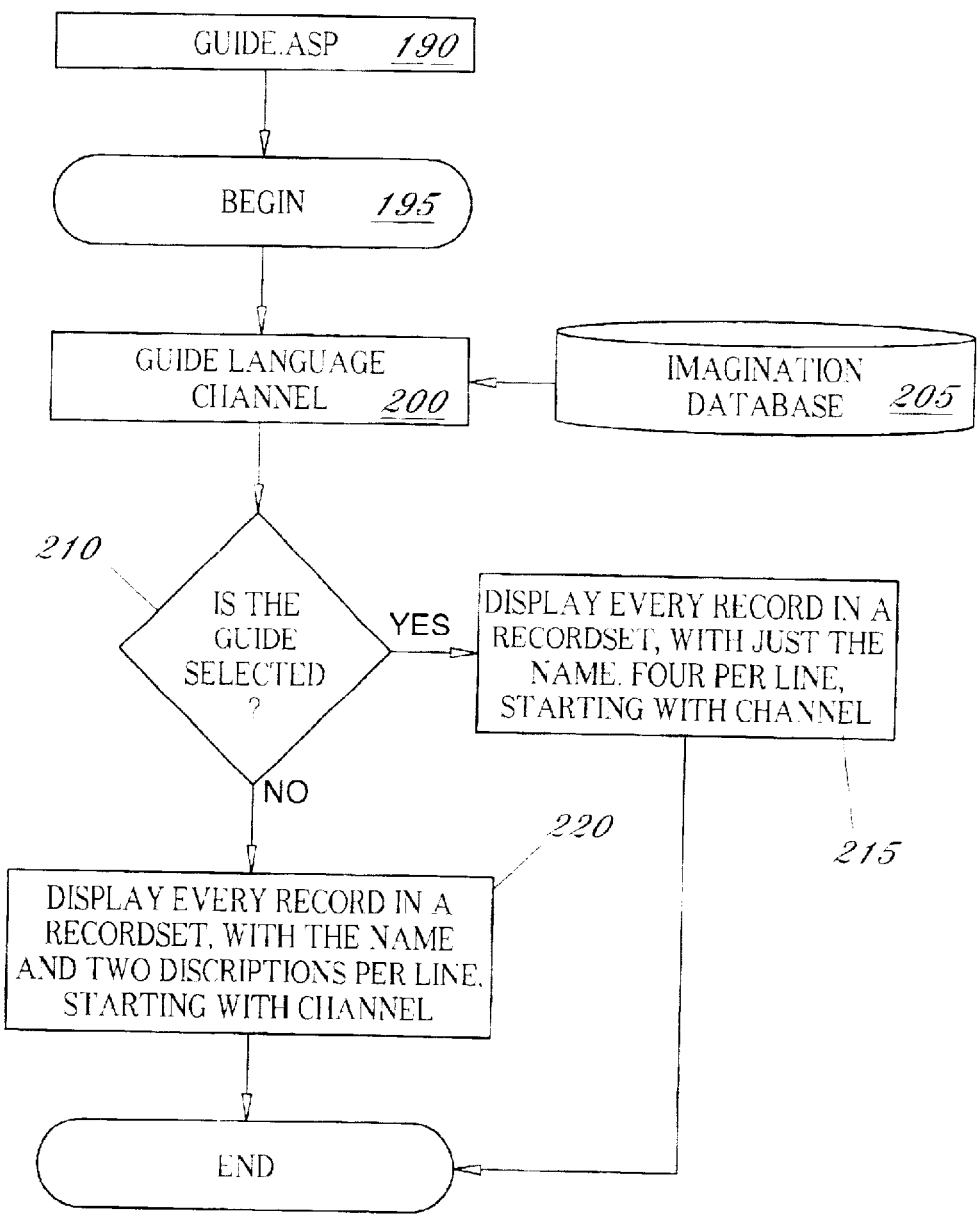
FIG. 5 illustrates a flow diagram showing the steps performed by the Imagination Guide portion of the present invention.

FIG. 5 illustrates the steps taken when the user invokes the Imagination Guide (IG) feature. The Guide.asp subroutine 190 is invoked 195 when the user selects the IMAGINATION GUIDE button 75 from remote control image 60. The IG database 205 is comprised of groups of web site addresses, each group classified according to a specific subject category, language and channel 200. The system then determines if the user has selected the Imagination Guide, via step 210.

If the Imagination Guide has been accessed, each recordset of channels containing web pages having subject matter related to the selected subject category heading 80 is displayed in channel section 100, via step 215. As shown in FIG. 2, the IG has not yet been selected and section 100 displays a default listing of channel numbers 95, in ascending order, allowing the user to scroll to the channel number 95 of choice. Following each channel number 95 are brief channel content descriptions 105. This gives the user information identifying the subject matter or owner of the web site corresponding to each channel. If the Imagination Guide has not been accessed, step 220, each recordset is displayed in section 100. In this case where the user has not selected the Imagination Guide, the recordset is simply consecutive channel listings, without regard to subject matter content.

Figure 6A:
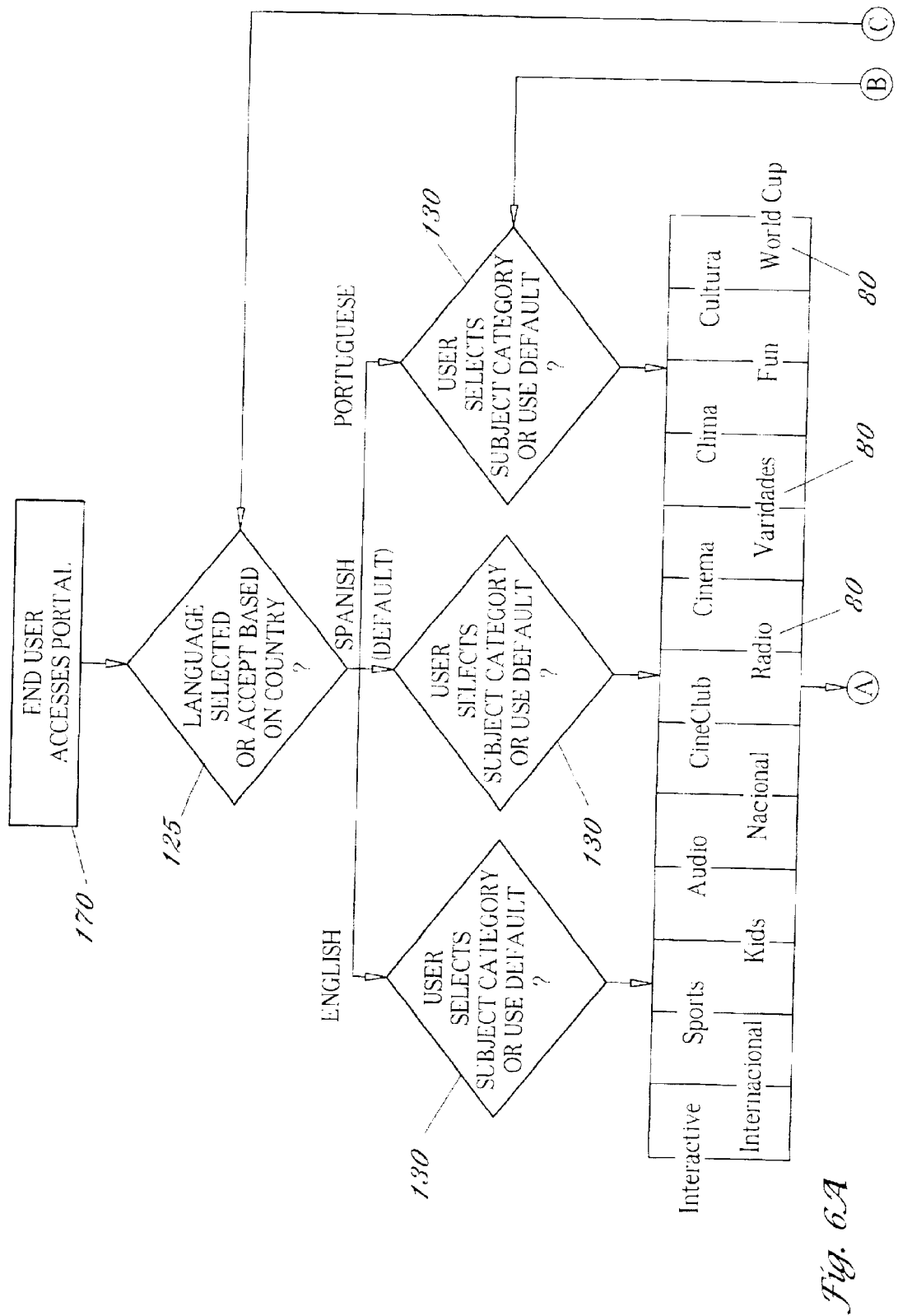
FIG. 6A is a flow diagram illustrating the function of the channel database when the user has entered the "Imagination Guide mode".

FIG. 6A further illustrates the function of the channel database when the user has entered the "Imagination Guide mode". After the user has accessed the portal containing the present invention, step 170, the user chooses a language or accepts the default language associated with the user's lactation, step 125 and selects a subject category 80, via step 130. Once again, the user can select from a listing of available subject categories 80 or choose to access a default subject category. In the preferred embodiment of the invention, the subject categories 80 vary depending upon the language selected by the user.

Figure 6B:
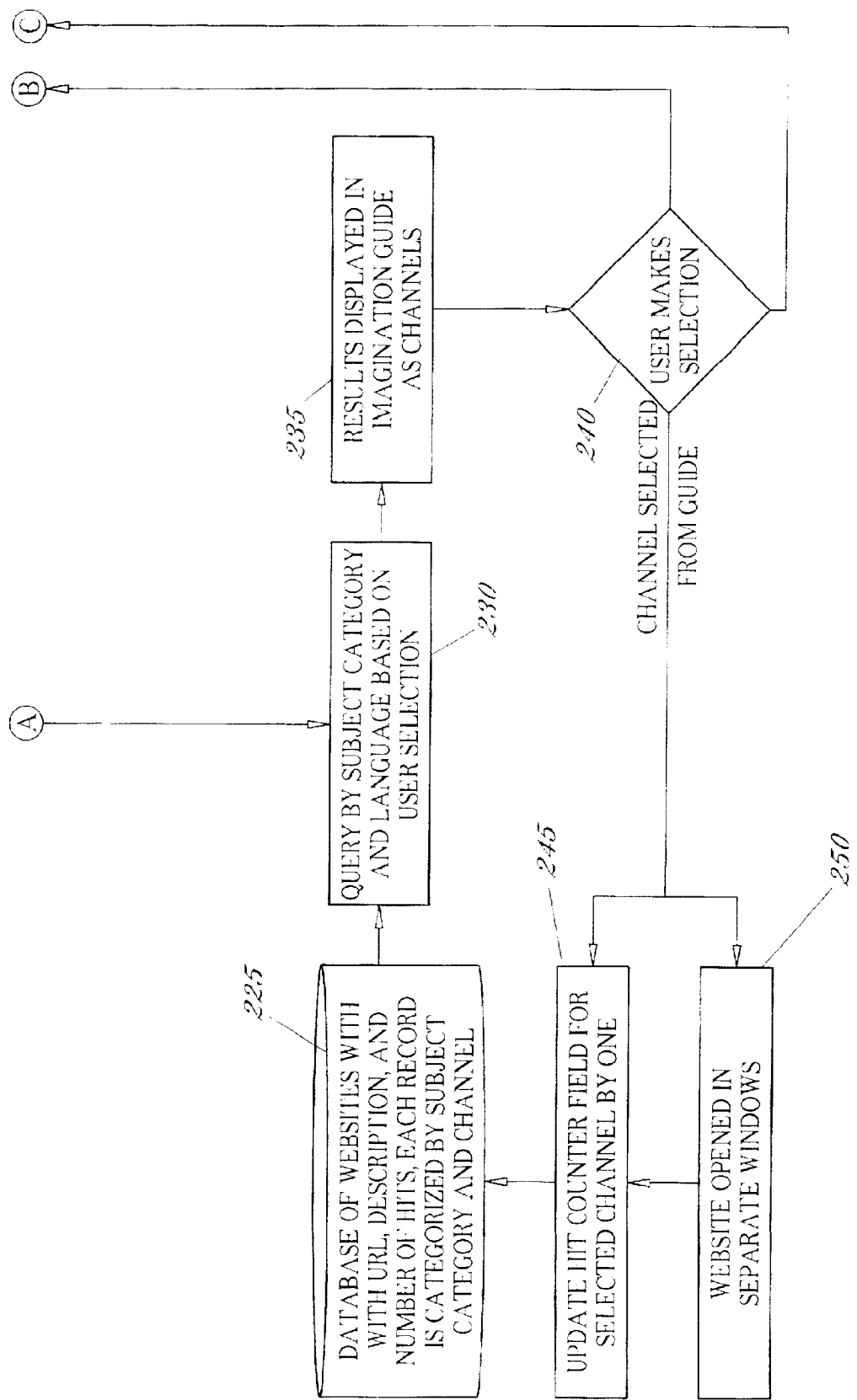
FIG. 6B is a continuation of the flow diagram of FIG. 6A.

Referring to FIG. 6B, a continuation of the flow diagram of FIG. 6A, the database of records containing web sites with identifying URLs, descriptions and number of hits 225 is queried based upon the selected subject category and language, step 230. The results, i.e. the channels representing web pages having subject matter related to the selected subject, are displayed in section 100 of screen 50, via step 235. The user then selects one of the listed channels, step 240, in which case the web site content related to the chosen web site is displayed, via step 250 and a counter recording the number of "channel hits" is updated, step 245. If a new language is selected, the process is updated and the user presented with new subjects to choose from. If a new subject category is selected, a new query is sent to the web site database and new results displayed in Imagination Guide section 100.

Figure 7A:
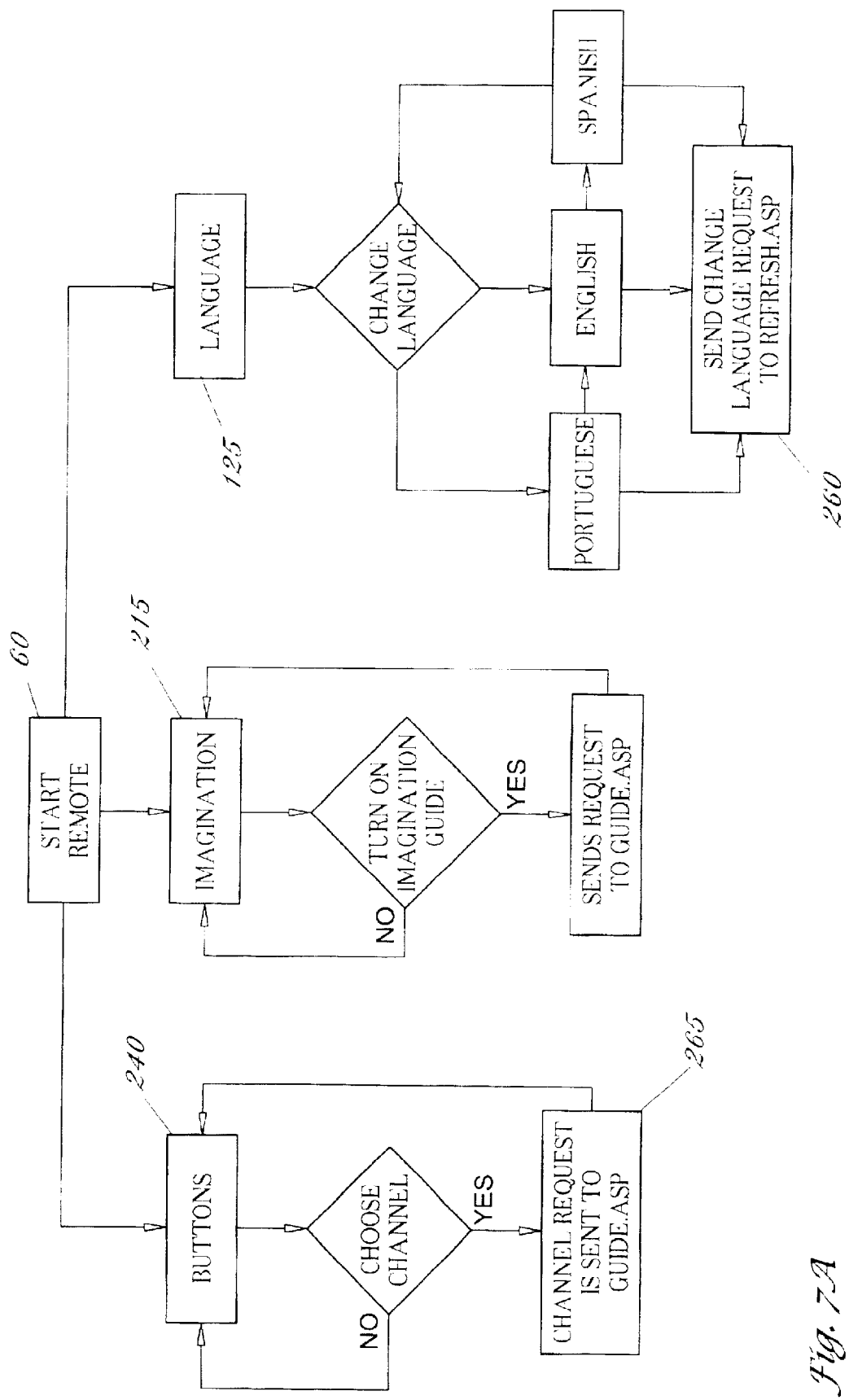
FIG. 7A illustrates a flow diagram showing the steps performed by the Remote Control portion of the present invention.
Figure 7B:
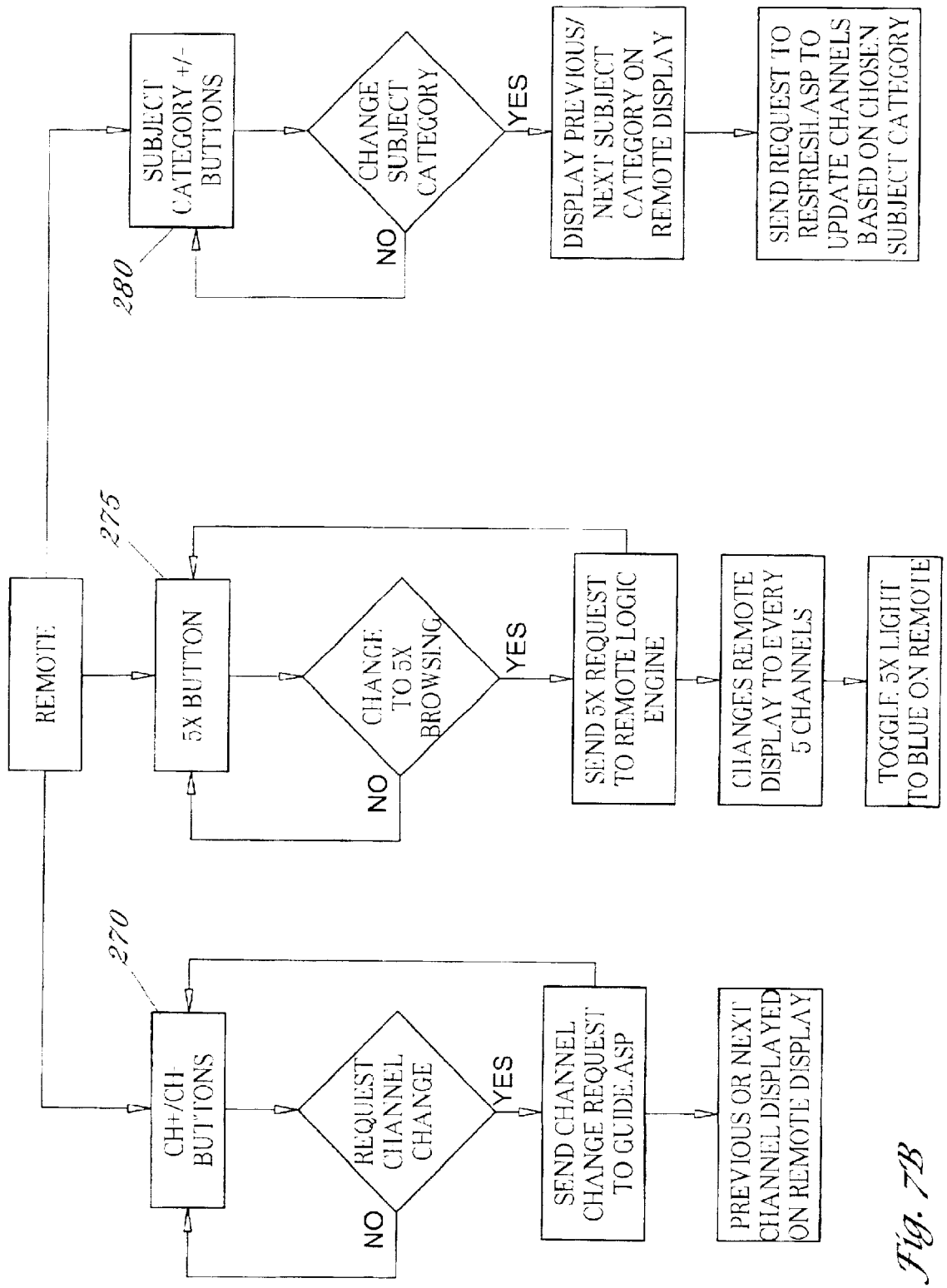
FIG. 7B is a continuation of the flow diagram of FIG. 7A.
Figure 7C:
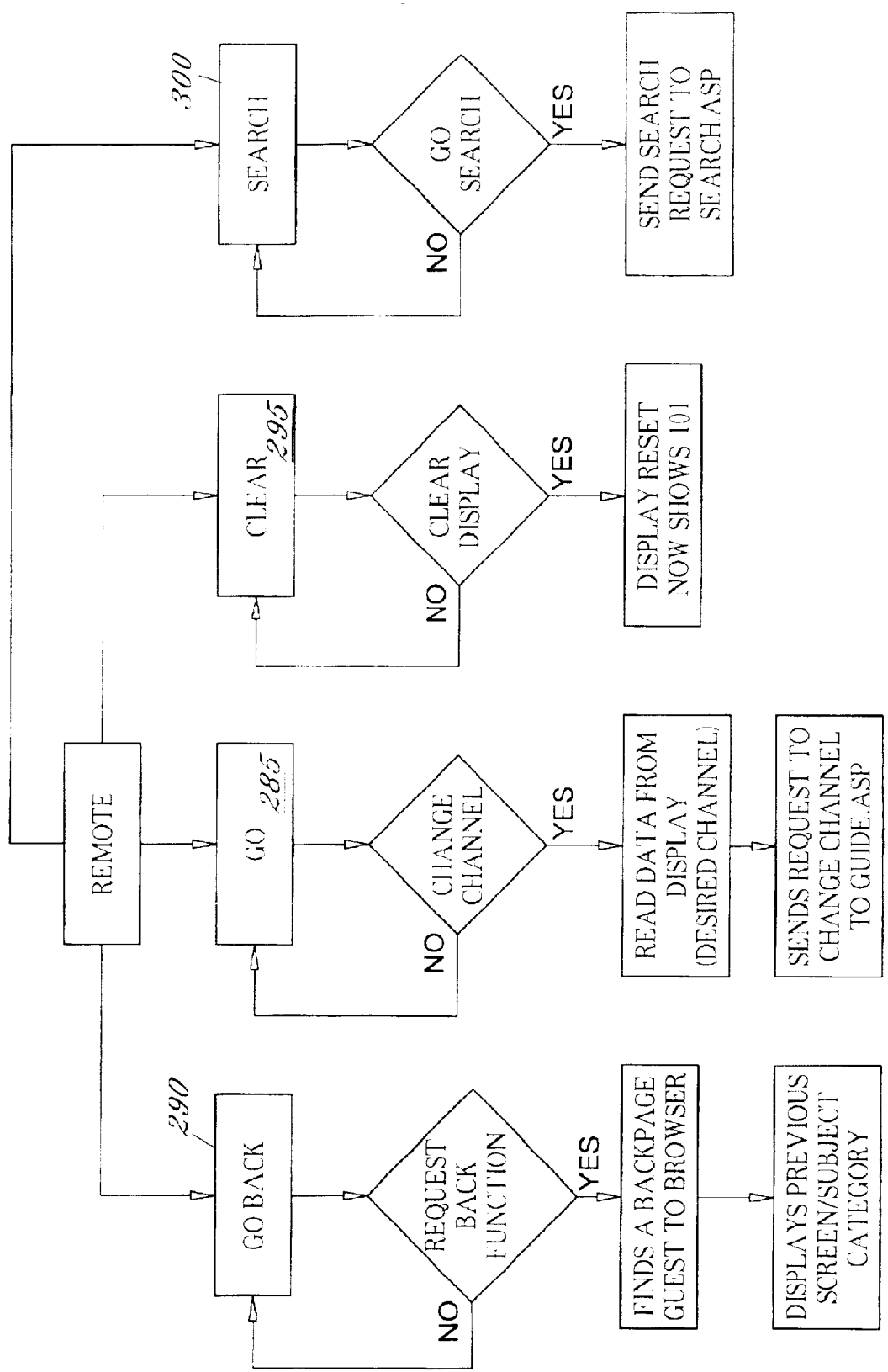
FIG. 7C is a continuation of the flow diagram of FIG. 7B.

FIGS. 7A–7C illustrate the steps taken when using the remote control subsystem of the present invention. The user screen 50 includes a section with the image of a remote control device 60, similar to a remote control used to operate a television. In this manner, an Internet user can navigate through "channels" each representing a distinct web page as one would navigate through television channels, each representing a different television station.

In FIG. 7A, from remote control image 60, the user can simply click and select the appropriate language 125, channel 240, or access the Imagination Guide subsystem, via step 215. When the system receives a request for a specific language, a Change Language request 260 is sent to the Refresh.asp subroutine 165. The subject category choices are then refreshed, depending upon the language chosen. If the user selects a channel directly without invoking the IG, a Channel Request 265 is sent directly to the Guide.asp subroutine 190 and the selected channel is displayed. When the IG is invoked, a request is forwarded to the Guide.asp routine 190, and the system awaits a subject category selection from the user. An appropriate channel list is then displayed in section 100.

In FIG. 7B, user remote control features are illustrated. The user can scroll up or down to get to the desired channel, step 270, or skip channels by 5 (or other multiples) to reach the desired channel, step 275. Additionally, instead of pointing out and clicking the desired subject category 80, the user can select the subject of choice using the remote control image, via step 280. Here, the category 80 is displayed on the remote control image display 60 and the user can scroll to the subsequent or previous subject category by using buttons on the remote control image.

FIG. 7C illustrates additional features of the remote control subsystem including GO 285, GO BACK 290, CLEAR 295 and SEARCH 300 features.

Depending upon the subject category chosen, advertisements appear on the user's computer screen 50. Choosing the subject "KIDS", for example, will provide the user with a list of available child-oriented web page choices. Choosing subject category heading 80 also retrieves advertisements, each based upon the subject selection.

The invention determines which subject category 80 has been selected and how it retrieves appropriate advertisements, which include logos, data, text and hyperlinks. Several advertisements can be displayed by a rotating engine that displays an advertisement at a specific screen location, and if no action (point-and-click) is taken by the user, displays another advertisement in the same screen location. If the user clicks on an advertisement within a given time (five seconds, for example), the "hit" is tracked, the advertiser's URL is displayed in a separate window and the advertiser's web site is displayed.

Figure 8:
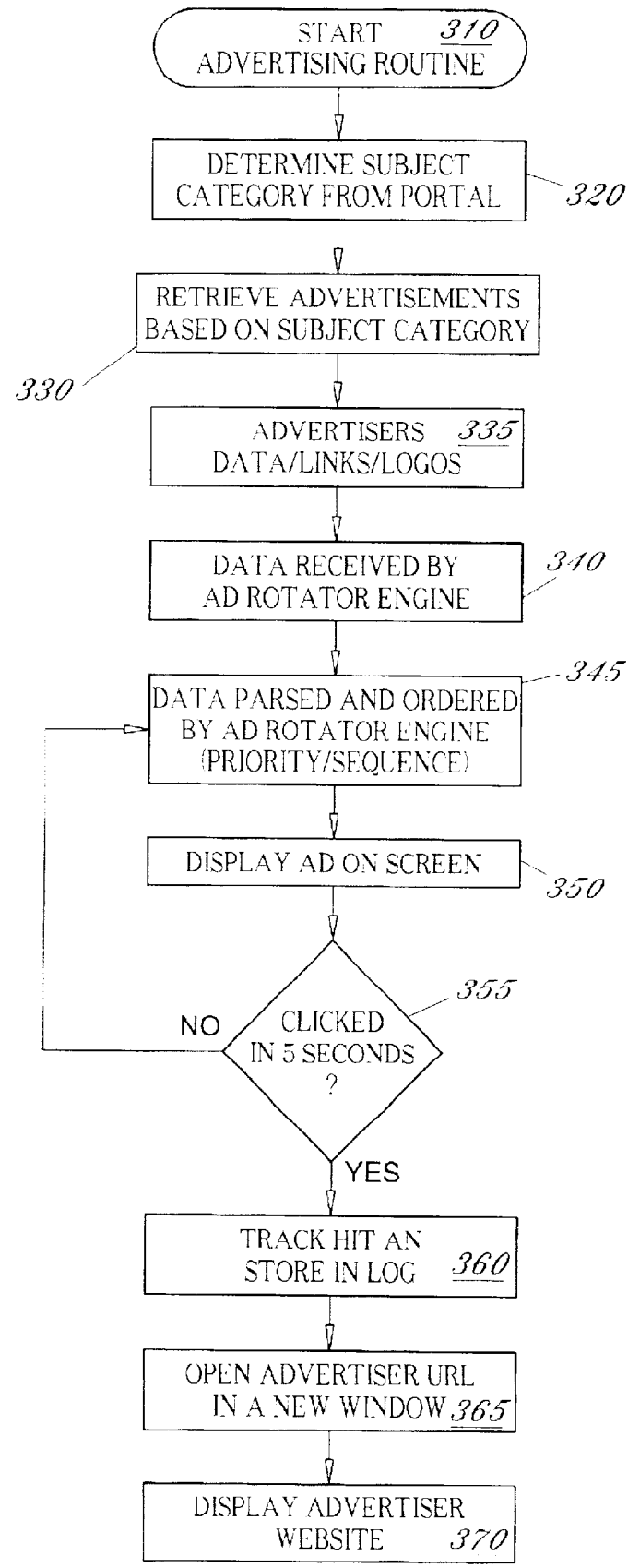
FIG. 8 illustrates a flow diagram showing the steps performed by the Advertising Flow portion of the present invention.

In FIG. 8, the advertising routine begins, step 310, and the selected subject is determined, step 320. Advertisements based upon the selected subject are retrieved, via step 330. The advertiser's data, related links and logos 335, are retrieved by an ad rotator engine, step 340. The priority and sequence of the advertisements are determined as the data is parsed and placed in a rotating order by the ad rotator engine, via step 345 and displayed on screen 50 via step 350. If the advertisement, text or logo is not clicked on by the user within a predetermined amount of time, step 355, the data is parsed again 345. If the user does click on the advertisement, a counter is updated, via step 360, the advertiser's URL is opened in a new window, step 365, and the advertiser's web site is displayed, via step 370.

Figure 9A:
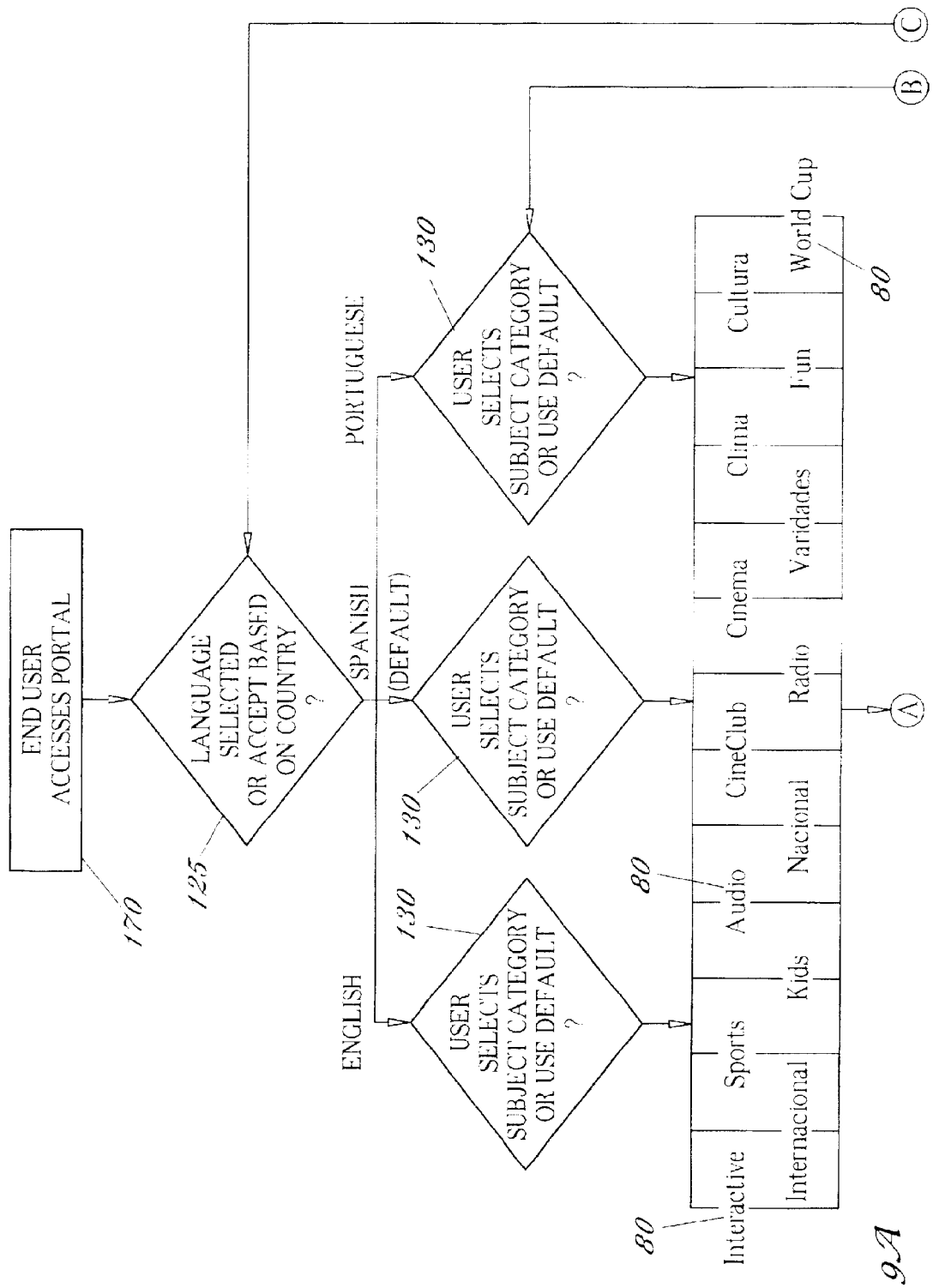
FIG. 9 illustrates a flow diagram showing the steps performed by the Scrolling Text portion of the present invention.

FIG. 9A illustrates the step-by-step process used to display text in the ticker window 112 of screen 50. After the user has accessed the portal containing the present invention, via step 170, and selected a language, via step 125, the user selects a subject category, step 130 from the listing of subjects 80.

Figure 9B:
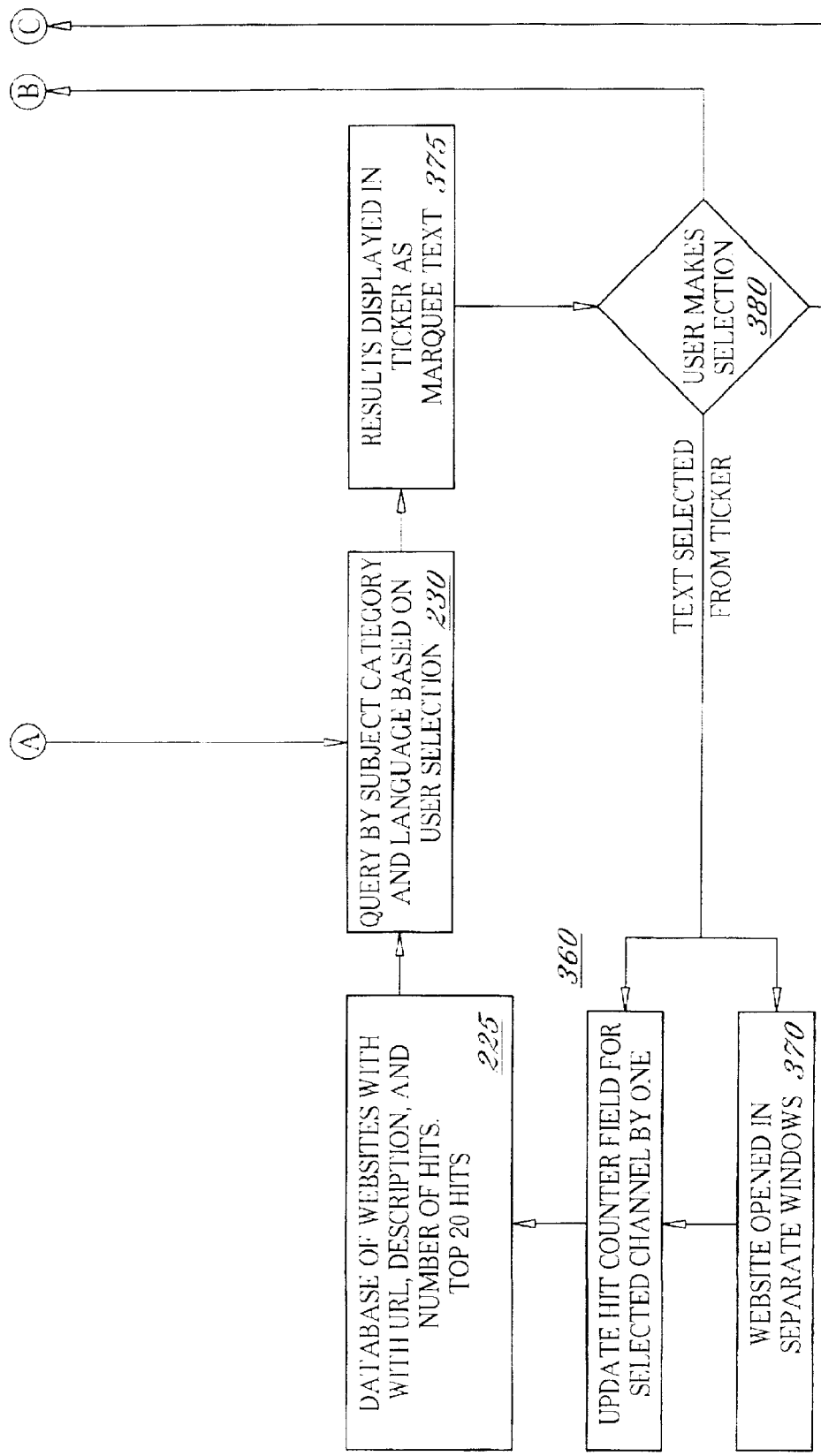

In FIG. 9B, a continuation of the flow diagram of FIG. 9A, once again, the web site database 225 is queried based upon the language and subject category selection inputs, step 230, and results are displayed in the ticker window section 112, as marquee, or scrolling text, via step 375. The user then selects text from the scrolling ticker window 112, via step 380, which prompts the channel "hit" counter to be updated for the channel corresponding to the scrolling text via step 360 and the web site corresponding to the channel to be displayed 370. The channel process continues until a new subject or new language is selected. The text in the ticker window appears as scrolling or marquee text, and might include stock prices if a "FINANCE" subject is chosen, or sports scores if the "SPORTS" subject is chosen.

Figure 10A:
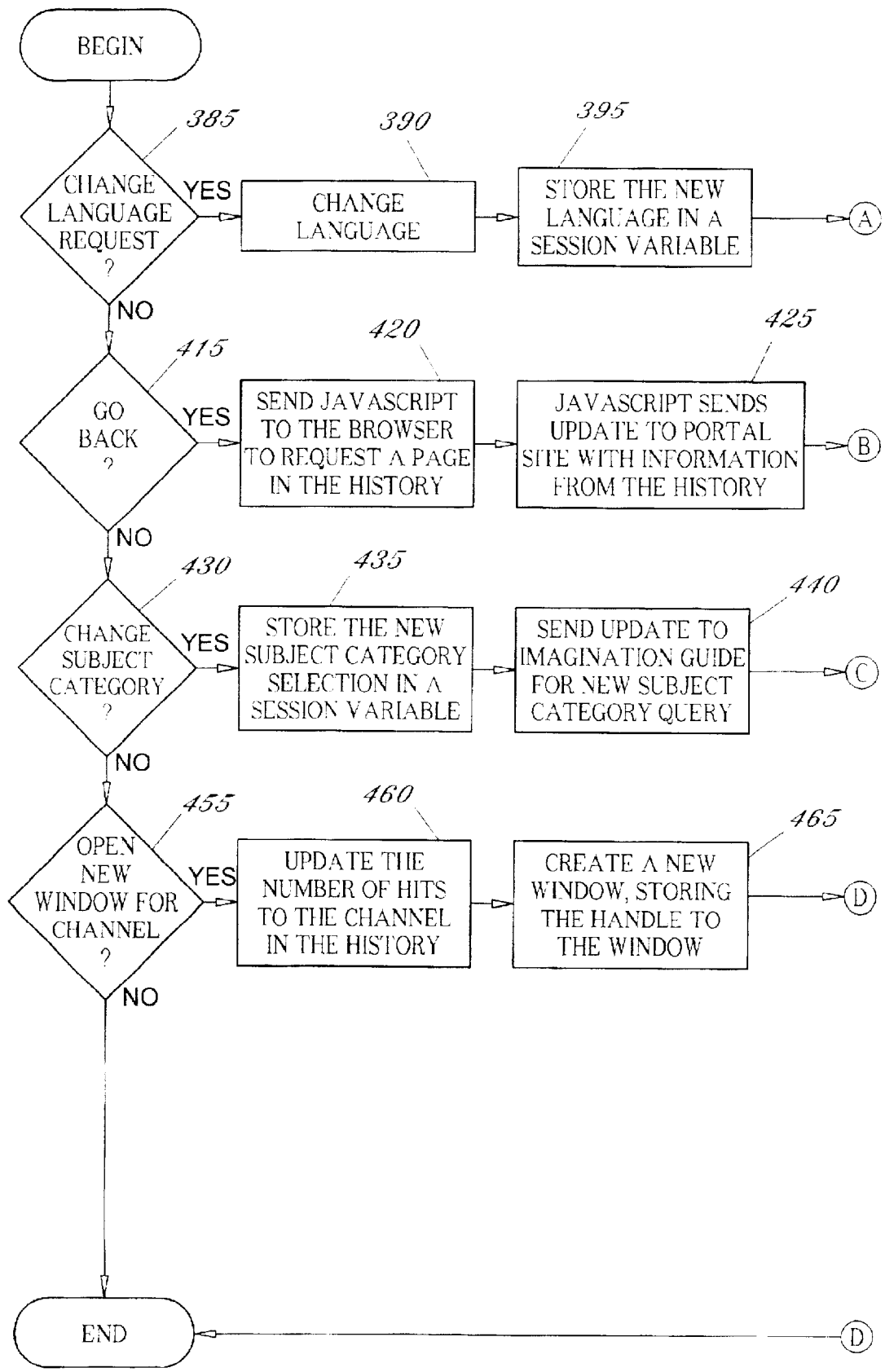
FIG. 10A illustrates a flow diagram showing the steps performed by the Refresh.asp subroutine of the present invention.
Figure 10B:
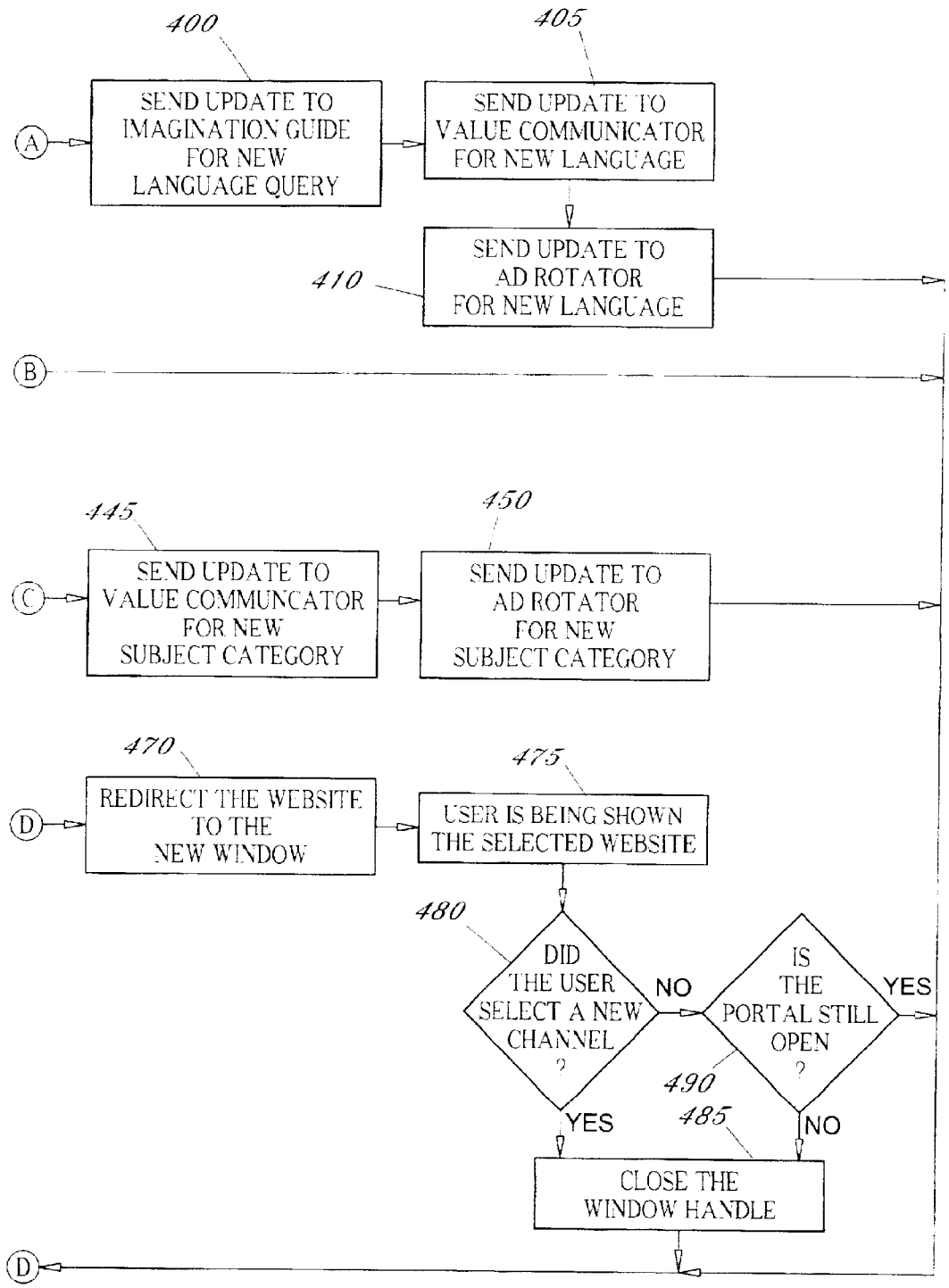
FIG. 10B is a continuation of the flow diagram of FIG. 10A.

FIGS. 10A and 10B illustrate the refresh.asp subroutine 165 that refreshes the user's screen after certain user variables are entered. If the system detects a change of language request 385 the language is changed 390 and stored as a session variable via step 395. The imagination guide database is updated by a new language query, step 400 (in FIG. 10B), an update is sent to the value communicator to refresh the content in that section with new content based upon the new language, step 405 (FIG. 10B), and an update is sent to the ad rotator engine for new language, via step 410(FIG. 10B).

If the user does not change the language, the system then determines if the user has requested an earlier page, via step 415. The user may, at times wish to revert back to a previously displayed web page. If this is the case, a request is made to retrieve an earlier page, 420 and JAVASCRIPT, or an equivalent application, sends an update to the web portal site 15 with information from history, step 425.

Subroutine 165 then determines if the user has requested a change of subject, step 430. If "YES", then the new subject selection is stored as a session variable, step 435 and updates are sent to the imagination guide for a new subject query, step 440 and to the value communicator 445 (FIG. 10B) and ad rotator engine 450 (FIG. 10B), for a new subject category.

If the user has not changed the subject category, the subroutine then detects if a new window must be opened based upon a user request for a specific channel, step 455. If this is "YES", the channel tracker is updated, step 460, and new window is created, with a window handle, or identification parameter, being stored, via step 465, the web site is redirected to the new window 470 (FIG. 10B), and the user is shown the new web site, step 475 (FIG. 10B). If the user has selected a new channel 480, the window handle is closed, via step 485. If the user has not selected a new channel the system is queried as to the status of web portal 15, at step 490. If web portal 15 is no longer open, the window handle is also closed, at 485.

The following represents portions of the source code for the referesh.asp routine. Generally, the subroutine updates the system tracking system by adding 1 to the count_of_hits, and if the user selects a channel, adding 1 to the count_of_hits for the selected channel; opens a new window, showing the channel in the open window; if the user selects a new language, updating the system with this information; if the user selects a new screen layout, using the VIEW button on the remote image, notify the system.

```
Response.AddHeader "Pragma", "no-cache"
Response.CacheControl = "no-cache"
Response.Expires=-1
<!--#INCLUDE FILE=". ./_Include/Portal.inc" --> <%'This line is
from the
WebMerge - BOSS files %>
<%
Response.Buffer=false 'Comment this line once the coding is done.
done=false 'Set this when we find our option
if Request.Item("ID")<>"" then
'Lets log this visit to the program:
set ObjDB=DbConnection
objDB.Open
sql="insert into watcher (IP, ID) values ('" &
Request.ServerVariabies("REMOTE_ADDR") & "', " &
Request.Item("ID") &")"
set ObjRS = ObjDB.Execute(SQL)
'set ObjRS = nothing
'set ObjDB = nothing
'        Response.Write "<!--Found ID - Launching new window-->"
        done=true
'        Set ObjDB = DbConnection
'        ObjDB.Open
'Lets store the ID
ID=Request.Item("id")
'Get the CountofHits
sql="select url, CountofHits, Channel from IG where ID=" & id
'Set ObjOB = DbConnection
'ObjDB.Open
Set ObjRS = ObjOB.Execute(Sql)
url=Trim(objrs("URL"))
Session("Channel")=Trim(objrs("Channel"))
'Add 1 to the count
CountofHits=trim(objrs("CountofHits"))+1
'Update the CountofHits
sql="UPDATE IG SET CountOfHits = " & CountofHits & "WHERE
ID = " &
id
```

-continued

```
Set ObjRS = ObjDB.Execute(Sql)
set ObjRS = nothing
set ObkDB = nothing
%>
<html>
<head>
<script language="JavaScript">
var remote=null;
function rs(u) {
    remote=window.open('<%=url%>', 'channel', 'width=800, height=600,
left=0, top=200,
resizable=yes,scrollbars=yes,status=0,menubar=yes');
}
function unl( ) {
    remote.close( ); }
</script>
</head>
<body
onload="rs(0);top.control.location='/portal/controle_remoto.html?t
ime=<%
=timer*100%>';" onunload="unl( )">
    Loading Page . . . <%=url%>
</body>
</html>
<%
end if
if not done and Request.item("language")<>"" and 1=2 then
    done=true
    select case ucase(session("Language"))
        case "E" : Session("Language")="S"
        case "S" : Session("Language")="P"
        case "P" : Session("Language")="E"
    end select
%>
<html>
<body
onload="top.guide.location='/portal/guide.asp?time=<%=timer*100%>'
;
top.subbrands.location='/portal/selector.asp?time=<%=timer*100%>';
top.communicator.location='/portal/portal.asp?time=<%=timer*1000%>
'">
    old-Changing Languages - <%=session("Language")%> -
<%=timer*1000%>'s
</body>
</html>
<%
end if
if not done and Request.item("language")<>""then
    done=true
    select case ucase(session("Language"))
        case "E" : Session("Language")="S"
        case "S" : Session("Language")="P"
        case "P" : Session("Language")="E"
    end select
%>
<html>
<body
onload="top.guide.location='/portal/guide.asp?time=<%=timer*100%>'
;
top.subbrands.location='/portal/subbrands.asp?time=<%=timer*100%>'
;
top.communicator.location='/portal/portal.asp?time=<%=timer*1000%>
'">
    new-Changing Languages - <%=session("Language")%> -
<%=timer*1000%>'s
</body>
</html>
<%
end if
if not done and Request.item("hlanguage")="1" then
    done=true
    select case ucase(session("Language"))
        case "F" : Session("Language")="S"
        case "S" : Session("Language")="P"
        case "P" : Session("Language")="E"
    end select
%>
<html>
<body
```

-continued

```
onload="top.guide.location='/portal/guide.asp?time=<%=timer*100%>'
;
top.subbrands.location='/portal/subbrands.asp?time=<%=timer*100%>'
;
top.communicator.location='/portal/portal.asp?time=<%=timer*1000%>
'">
    Changing Languages - <%=session("Language")%> -
<%=timer*1000%>'s
</body>
</html>
<%
end if
if not done and Request.Item("Channel")<>""then
    done=true
    C=Request.Item("Channel")
    L=Session("Language")
    S=Session("Subbrand")
    sql="select id from ig where channel='" & C & "' and Lang='" & L
& "'
and Subbrand='" & S & "'"
        Set ObjDB = DbConnection
        ObjDB.Open
        Set ObjRS = ObjDB.Execute(Sql)
        ID=ObjRS("ID")
        set ObjDB = Nothing
        Set ObjRS = Nothing
        Response.Redirect "refresh.asp?id=" & id
    end if
    if not done and Request.Item("Skins")="1" then
        done=true
        L=session("BaseHref")  'Which layout are we using???
        select case L
            case "/portal/default.asp" : L="/portal/default2.asp"
            case "/portal/default2.asp" : L="/portal/default3.asp"
            case "/portal/default3.asp" : L="/portal/default.asp"
        end select
        Session("BaseHref")=L
%>
<html>
<SCRIPT LANGUACE="JavaScript">
top.location.href = "<%=session("BaseHref")%>";
</SCRIPT>
</html>
<%
end if
if not done then Response.write "Didn't find the option.  " &
Request.QueryString
%>
```

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for use in a communications network to proactively assist a user in locating one or more web pages stored on servers connected to said communications network, each web page containing subject matter related to the user's chosen general area of interest, said method comprising the steps of:

presenting the user with an option of selecting at least one of a specific web page and at least one subject category of a plurality of subject categories;

displaying a plurality of said subject categories, each said subject category identified by a subject heading and being associated with a set of at least one web page, each said web page represented by a separate channel number, wherein each said set of web pages contain content related to a particular said subject category;

if the user selects said one of said plurality of subject categories, displaying said channel numbers, each said channel number corresponding to a web page containing subject matter related to said selected subject category;

allowing the user to initially select one of a plurality of classifications wherein upon said initial selection, and prior to a subsequent selection of a different classification, a different set of subject categories is presented for each said selected classification;

allowing the user to select said one of said displayed channels, wherein said steps of selecting said subject category, selecting said channel, and/or selecting said classification is performed by pointing and clicking on a button on a remote control image situated on the user's computer screen; and displaying web page content corresponding to said selected channel.

2. The method of claim 1, further comprising the steps of:

displaying channel content summary descriptions to enable the user to identify subject matter content or each said channel; and displaying subject category information comprising subject matter related to said selected subject category.

3. The method of claim 1, wherein said classification is a language and wherein upon said initial selection, text in each subsequent display will be in the selected language.

4. The method of claim 2, wherein said subject category information comprising subject matter related to said selected subject category includes advertisements, logos and/or text.

5. A system for use in a communications network to proactively assist a user in locating at least one web page stored on servers connected to said communications network, each web page containing subject matter related to the user's chosen general area of interest, said system comprising:

means for providing the user with an option of selecting at least one of a specific web page or one of a plurality of subject categories;

means for presenting the user with a list of said plurality of said subject categories, each said subject category being associated with a set of at least one web page wherein each said set of web pages contain content related to a particular said subject category;

means for selecting said one of said plurality of subject categories, means for displaying at least one said channel numbers, each said channel number corresponding to at least one web page containing subject matter related to said selected subject category;

means for allowing the user to select said one of said displayed channels; and means for displaying web page content corresponding to said selected channel, wherein said means for selecting said one of said plurality of subject categories, means for allowing the user to select said one of said displayed channels and means for allowing the user to initially select one of a plurality of classifications comprises a remote control image displayed on the user's computer screen.

6. The system of claim 5, further comprising:

channel content summary descriptions to enable the user to identify subject matter content of each said channel; and subject category information comprising subject matter related to said selected subject category.

7. The system of claim 6, wherein said subject category information comprising subject matter related to said selected subject category includes advertisements, logos an/or text.

8. The system of claim 5, further comprising: means for allowing the user to initially select one of a plurality of classifications wherein upon said initial selection, and prior to a subsequent selection of a different classification, a different set of subject categories is presented for each said selected classification.

9. The system of claim 8, wherein said classification is a language and wherein upon said initial selection, text in each subsequent display will be in the selected language.

10. A method for use in a communications network to proactively assist a user in locating at least one web page stored on servers connected to said communications network, each web page containing subject matter related to the user's chosen general area of interest, said method comprising the steps of:

displaying a plurality at subject categories, each said subject category being identified by a subject heading and associated with a set of web pages, each said web page represented by a separate channel number, wherein each said set of web pages contain content related to a particular said subject category;

allowing the user to initially select one of a plurality of languages wherein upon said initial selection, and prior to a subsequent selection of a different language, a different set of subject categories is presented for each said selected language;

displaying at least one said channel numbers, each said channel number corresponding to a web page containing subject matter related to a selected one of said subject catagories;

displaying channel content summary descriptions to enable the user to identify subject matter content of each said channel;

displaying subject category information comprising subject matter related to said selected subject category;

allowing tho user to select said one of said displayed channels, wherein the user uses a remote control image in order to select one of the plurality of languages and one of the displayed channels; and displaying web page content corresponding to said selected channel.

* * * * *